(No Model.)
J. PARKINSON.
HEATER FOR CEMENTING RUBBER TIRES.
No. 471,802.   Patented Mar. 29, 1892.
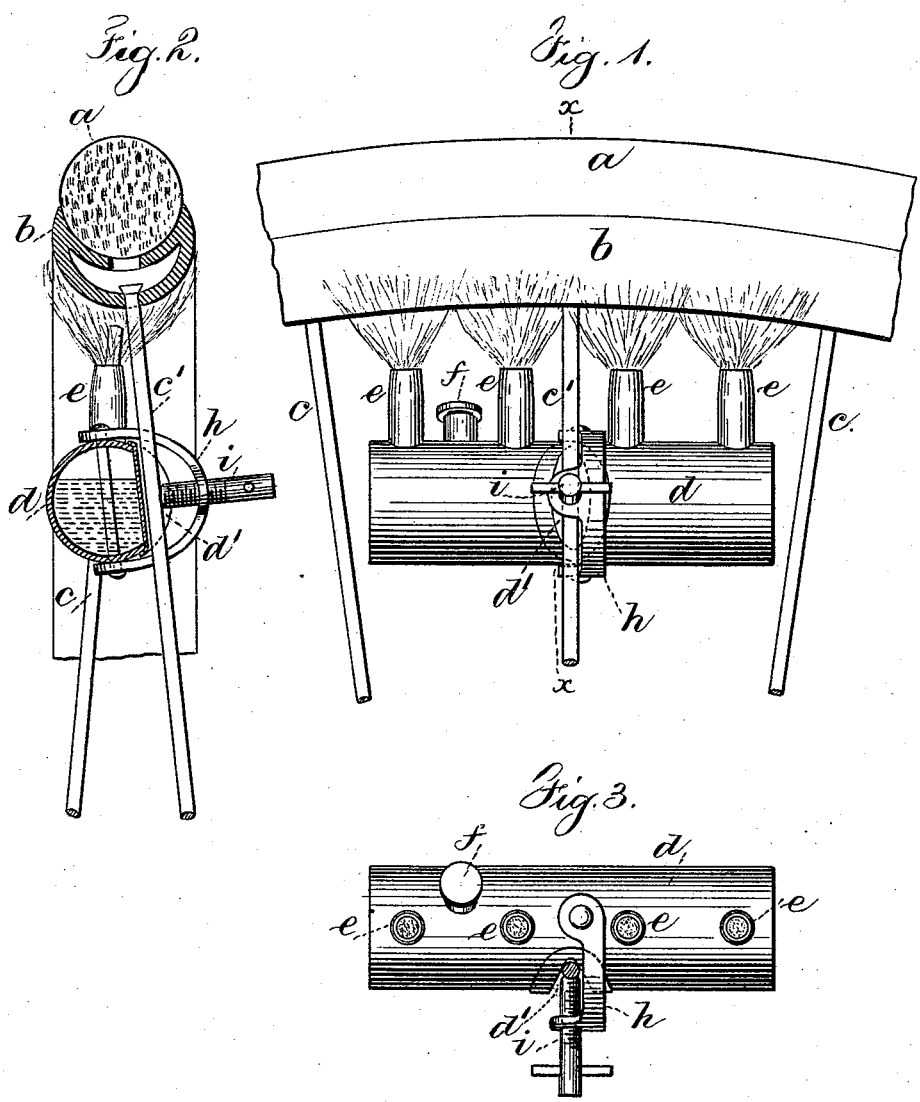
Witnesses
Chas. H. Smith
J. Staib
Inventor
John Parkinson
Per Lemuel W. Serrell
atty

UNITED STATES PATENT OFFICE.

JOHN PARKINSON, OF ELIZABETH, NEW JERSEY, ASSIGNOR TO GEORGE R. BIDWELL, OF NEW YORK, N. Y.

HEATER FOR CEMENTING RUBBER TIRES.

SPECIFICATION forming part of Letters Patent No. 471,802, dated March 29, 1892.

Application filed June 10, 1891. Serial No. 395,764. (No model.)

*To all whom it may concern:*

Be it known that I, JOHN PARKINSON, a citizen of the United States, residing at Elizabeth, in the county of Union and State of New Jersey, have invented a new and useful Improvement in Heaters for Cementing Rubber Tires, of which the following is a specification.

My present invention is designed as an improvement upon the devices set forth in Letters Patent granted to Montraville Hoyt August 4, 1885, No. 323,686, and January 26, 1886, No. 334,952.

In the heater suspended from the rim difficulty has been experienced in regulating the distance of the flame from the felly of the wheel, and in the heater supported by and between the spokes difficulty has been experienced because in different sizes and makes of wheels the spokes were of such varying distances apart that often the heating device could not be employed; and the object of my present improvement is to overcome these objections.

My invention consists in the combination, with a reservoir having burners and an approximately central groove in one side adapted to receive a spoke, of a yoke pivoted to the reservoir and adapted to swing over the spoke when in the groove, and a screw passing through the yoke and adapted to be forced against the spoke in the groove to clamp the heater in place and support the same beneath the felly of the wheel.

In the drawings, Figure 1 is an elevation of my heater as applied to a wheel. Fig. 2 is a cross-section of the same at the line $x\ x$ of Fig. 1, and Fig. 3 is a plan view of the heater.

The tire $a$, felly $b$, and spokes $c\ c'$ represent those of a bicycle or other wheel of any ordinary construction. The portable heating-lamp is composed of the reservoir $d$, which I prefer to make cylindrical and of a length to fit between alternate spokes adjacent to the felly $b$, and said reservoir is provided with burners $e$ and a filling-nozzle $f$ for the alcohol to be burned in heating the tire-cement to cement the tire to place. The reservoir $d$ is made with a central groove $d'$, preferably V-shaped on one side, which is adapted to receive a spoke. This groove is preferably made in a plate soldered to place. A yoke $h$ is pivoted at or near the center of the reservoir nearly in line with the groove $d'$, the axis of the pivots being parallel with the base of the groove. The central part of the yoke $h$ has a lip or nut, through which passes a thumb-screw $i$ or equivalent device, the rotation of which after a spoke has been put in the groove $d'$ brings the inner end of the screw to bear on the said spoke to clamp it in the groove, so as to hold the heater in position. The yoke is swung on its pivots out of the way to remove the spoke from the groove or to bring said parts into position, and said yoke is swung to bring the thumb-screw into line with the groove and spoke therein when it is desired to clamp the heater in place for work.

My improved heater is adapted to any wheel having wire spokes, and it can be connected to one spoke at a time and be raised or lowered on that spoke to adjust the burners to the right distance from the felly.

I claim as my invention—

1. The combination, with the reservoir $d$, having a groove $d'$ in one side to receive a wheel-spoke and the burners $e$, of a yoke $h$, pivoted to the reservoir and adapted to swing over the groove and a clamp on the yoke to act against the spoke and hold the parts together, substantially as set forth.

2. The combination, with the reservoir $d$, having a groove $d'$ in one side to receive a wheel-spoke and the burners $e$, of a yoke $h$, pivoted to the reservoir and adapted to swing over the groove and a thumb-screw $i$, passing through the yoke to clamp the spoke in the groove and support the heater in place, substantially as set forth.

Signed by me this 4th day of June, A. D. 1891.

JOHN PARKINSON.

Witnesses:
E. J. SMITH,
D. S. PLUMB.